United States Patent [19]
Bassa

[11] Patent Number: 5,950,899
[45] Date of Patent: Sep. 14, 1999

[54] DEVICE FOR CHANGING THE DIRECTION OF A MOVING WEB WITHOUT CONTACTING THE WEB

[76] Inventor: Altan Bassa, Sudetenring 41, Dreieich, Germany, 63303

[21] Appl. No.: 08/906,689

[22] Filed: Aug. 6, 1997

Related U.S. Application Data

[63] Continuation-in-part of application No. 08/553,976, Nov. 6, 1995, abandoned.

[30] Foreign Application Priority Data

Nov. 7, 1994 [DE] Germany ................. 44 39 639

[51] Int. Cl.[6] ................. B65H 23/04; B65H 20/00
[52] U.S. Cl. ................. 226/196.1; 226/95; 226/97.3
[58] Field of Search ................. 226/97, 95, 196, 226/168, 97.3, 196.1

[56] References Cited

U.S. PATENT DOCUMENTS

| | | | |
|---|---|---|---|
| 2,990,990 | 7/1961 | Wilkins et al. | 226/97 |
| 3,110,431 | 11/1963 | Potter et al. | 226/97 X |
| 3,197,339 | 7/1965 | Black et al. | 226/97 X |
| 3,767,097 | 10/1973 | Watts et al. | 226/97 X |
| 4,059,241 | 11/1977 | De Roeck et al. | 226/97 X |
| 4,760,946 | 8/1988 | Bassa | 226/97 |
| 4,941,606 | 7/1990 | Bigelow et al. | 226/97 X |
| 5,079,569 | 1/1992 | Bunch | 226/95 X |
| 5,224,641 | 7/1993 | Spicer | 226/97 |

*Primary Examiner*—Daniel P. Stodola
*Assistant Examiner*—Gregory J. Strimbu
*Attorney, Agent, or Firm*—Ratner & Prestia

[57] ABSTRACT

An apparatus for guiding and changing the direction of a moving web without contacting the web itself, and for preventing contact at the apparatus entry and, optionally exit points. The apparatus includes a reduced pressure box having a source of reduced pressure connected thereto, a convex web guide support, a portion of which is partially contained within the reduced pressure box, and an entry baffle having a top surface. The angle between tangents through reference points on the web guide support and the distance between the web guide support and the entry baffle are adjusted to prevent contact between the web and the reduced pressure box interior and entry baffle. The angle between tangents through reference points on the web guide support and the distance between the web guide support and the exit baffle may also be adjusted to prevent contact between the web and the reduced pressure box interior and exit baffle.

16 Claims, 5 Drawing Sheets

DEVICE FOR CHANGING THE DIRECTION OF A MOVING WEB WITHOUT CONTACTING THE WEB

CROSS REFERENCE TO RELATED APPLICATIONS

This is a continuation-in-part application of U.S. pending patent application Ser. No. 08/553,976 filed Nov. 6, 1995, now abandoned. Foreign priority is claimed based on prior foreign application P44 39 639.2 filed in Germany on Jul. 11, 1994. Parent application Ser. No. 08/553,976 contains the priority papers pertaining to this German application.

BACKGROUND OF THE INVENTION

1. Field of the invention

The invention relates to equipment for the guidance of a moving web and more particularly to an apparatus which changes the direction of the web's advance without contacting the web.

2. Description of the Related Art

In U.S. Pat. No. 4,760,946 a device is described for changing the direction of a web, without contacting the concave web surface formed at the inner side of the curved web section. The working principle disclosed is based on applying a differential pressure between the concave inner surface and the convex outer surface of the web which assumes a cylindrical shape at this region. The pressure differential is created with the help of a housing connected to a source of reduced pressure, which cooperates with a surface of a support to effect the direction change. The area between the web and the housing is identified as an outer zone and the area between the web and the back-up surface is identified as an inner zone. The inner zone communicates with the atmosphere. To seal the outer zone from the atmosphere and maintain a reduced pressure, sealing elements extending across the total width of the web at the points where the web enters and exits the housing are provided.

The embodiments illustrated in U.S. Pat. No. 4,760,946 use rollers as sealing elements, each of which forms a first sealing point with the web and a second sealing point with a wall of the housing. This configuration allows a very efficient sealing of the housing against the atmosphere because no air leakage can occur between the roller and the web in contact with it.

Also the efficiency of sealing at the position between the roller and the housing can be improved significantly by designing this clearance as a long and narrow gap. This capability results in a number of advantages with respect to design flexibility for the housing and the reduced pressure source.

The major disadvantage of the use of sealing rollers, however, is the inevitable contact of the outer web surface by the rollers. This excludes the use of such a design in combination with materials tolerating no contact on any of the two web surfaces, as is the case for web materials freshly coated or printed on both sides. The same problems arise when scratches or electrostatic charging and subsequent electrostatic discharge marks are to be avoided.

Non contacting web turning devices have been developed, but such devices generally suffer from web instability problems particularly serious at the starting and ending points of the web direction change.

There is still a need for an apparatus and method which can alter the web direction without any contact with the outer web surface in a way which prevents web instabilities particularly at the beginning and ending points of the web direction change.

SUMMARY OF THE INVENTION

The aforementioned desirable result is obtained by the present invention which is an apparatus for guiding and changing the direction of a moving web having an inner and an outer surface, without contacting said web, the apparatus comprising:
  a reduced pressure box,
  a source of reduced pressure connected to said reduced pressure box;
  a convex web guide support, a portion of which is partially contained within said reduced pressure box,
  an entry baffle having a top surface;
wherein the entry baffle and the web guide support are positioned relative to each other so that:
  a first tangent to the web guide support at a reference entry point E on the web guide support corresponding to the point where the web would first contact the web guide support in the absence of the reduced pressure in the reduced pressure box and a second tangent to a reference entry closest point M on the web guide support corresponding to the point where a distance $d_{min}$ measured between the entry baffle top surface and the web guide support is a minimum distance, form a first angle δ between 0 and 25 degrees.

Preferably, in the above described apparatus, the distance $d_{min}$ is between 2% and 15% of a radius of curvature of the convex web guide support at point M.

A similar baffle arrangement may be placed at the exiting point of the web from the reduced pressure box, where the web has finished changing direction in which case the apparatus described above may further include an exit baffle also having a top surface, positioned so that: a third tangent to the web guide support at a reference exit point E' on the web guide support corresponding to the point where the web would last contact the web guide support in the absence of the reduced pressure in the reduced pressure box and a fourth tangent to a reference exit closest point M' on the web guide support corresponding to the point where a distance $d'_{min}$ measured between the exit baffle top surface and the web guide support is a minimum distance, form a second angle δ' between 0 and 25 degrees.

The entry baffle may terminate at a point K where the distance between the entry baffle top surface and the web guide support is a minimum distance $d_{min}$ or may extend beyond this point of closest approach into the reduced pressure box. Point K may, but does not have to, be at the junction of one end of the baffle and a side wall of the reduced pressure box.

BRIEF DESCRIPTION OF THE DRAWINGS

The invention can be more fully understood from the following description thereof in connection with the accompanying drawings described as follows.

DESCRIPTION OF THE PREFERRED EMBODIMENT(S)

Figure 1:
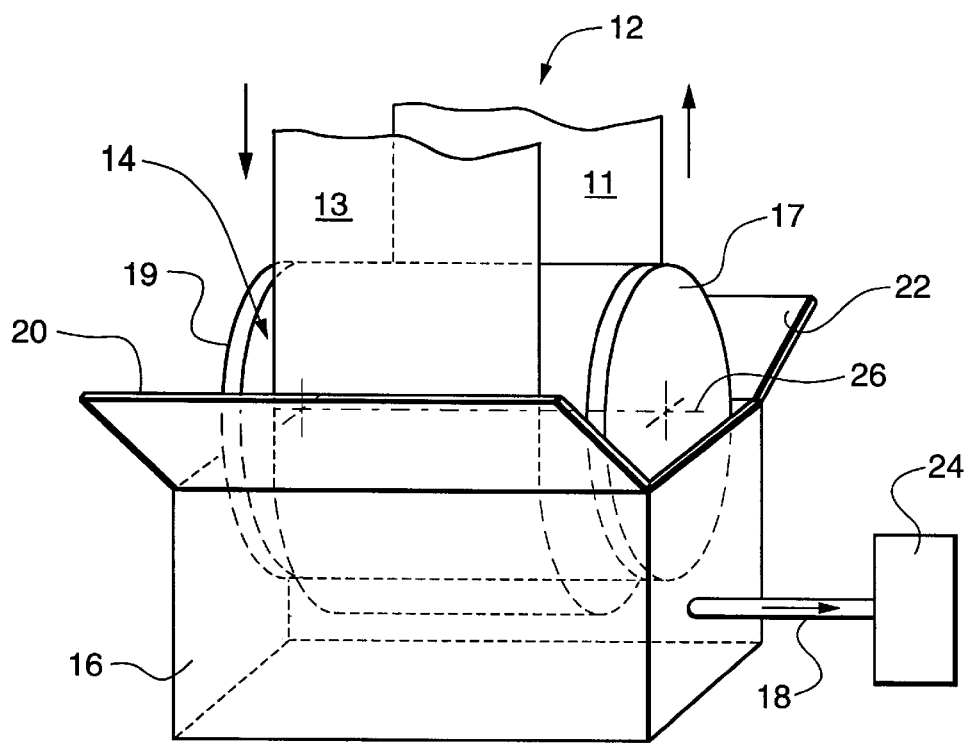
FIG. 1 is a schematic perspective illustration of an apparatus constructed in accordance with the present invention.

Throughout the following detailed description, similar reference characters refer to similar elements in all figures of the drawings.

Referring now to FIG. 1, there is pictured in three dimensional representation a moving web 12 having an inner surface 11 and an outer surface 13, advancing in the direction of the arrows and passing through a reduced pressure housing or box 16 where the web direction is changed by about 180°. The web in its path turns around over a web guide support 14 which in this embodiment is shown as being a smooth cylindrical surface with a circular cross-section having an axis 26 and being bounded by two flanges 17 and 19. Flanges 17 and 19 have the same diameter as the web support 14. The housing 16 also includes an entry baffle 20 and an exit baffle 22, and is connected through a connector 18 to a source of reduced pressure 24, such as a vacuum pump.

Figures 2A, 2B:
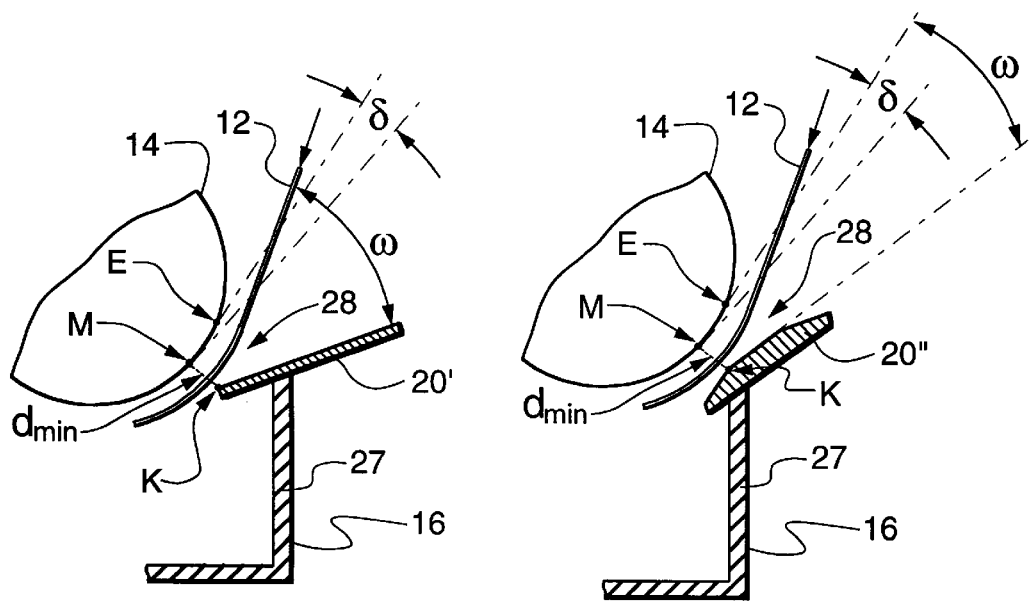
FIG. 2A is an enlarged schematic elevation representation of the entry portion of FIG. 2 showing an alternate baffle placement according to an alternate embodiment of the present invention.
FIG. 2B is an enlarged alternate schematic elevation representation of the entry portion of FIG. 2 showing yet another baffle arrangement according to an alternate embodiment of the present invention wherein the baffle top surface is not planar.
Figure 2:
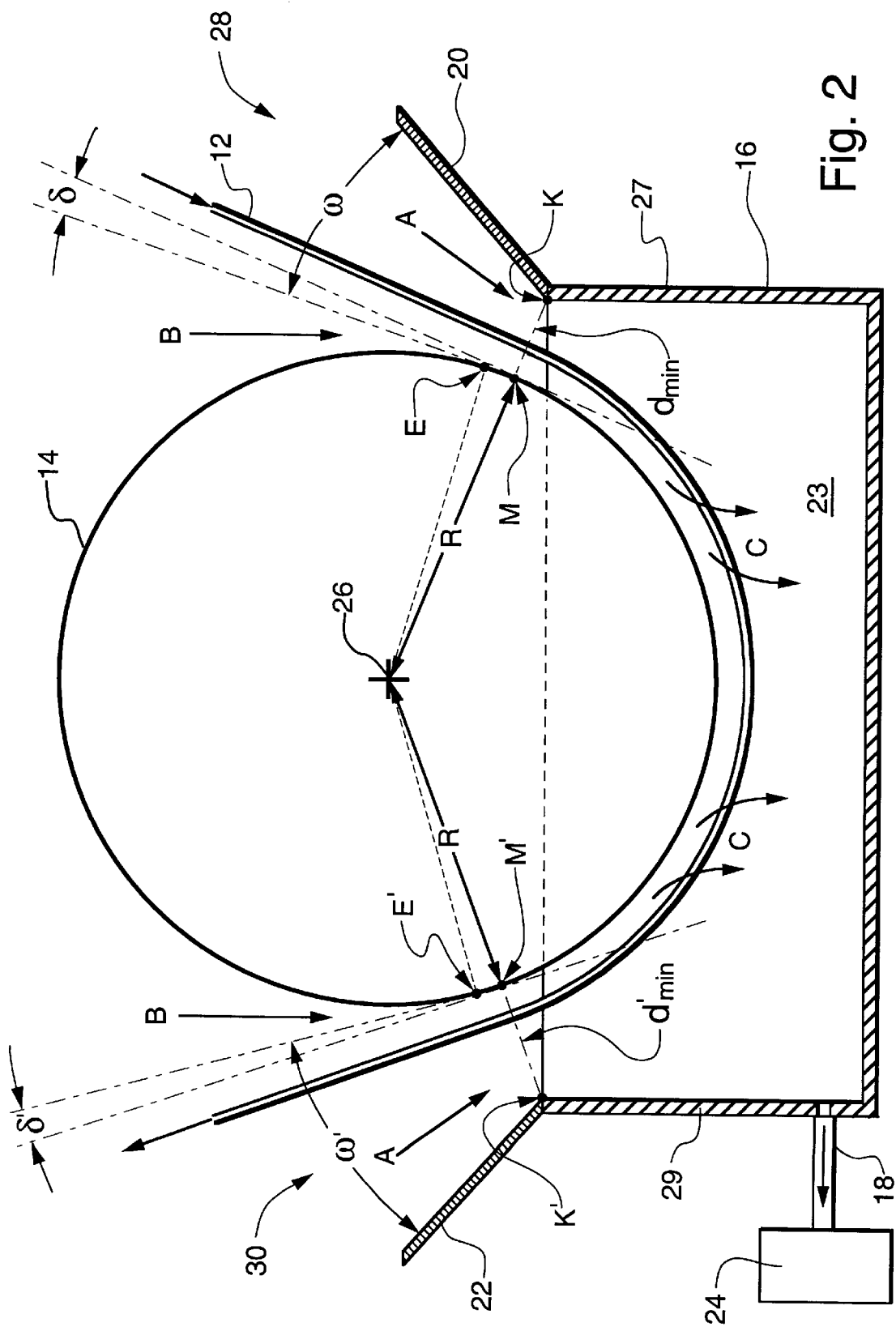
FIG. 2 is a schematic elevation representation of an apparatus constructed in accordance with the present invention.

Referring next to FIG. 2, there is shown in detail the critical elements which must be considered in practicing the present invention. FIG. 2 shows in schematic representation an elevation cross-sectional view of the reduced pressure housing 16 including the baffles 20 and 22, the moving web 12, and the web guide support 14. The web is moving in the direction shown by the arrows on the web and in this illustration undergoes a direction change of about 140°. As shown the web guide support 14 is cylindrical preferably having a circular cross-section. The axis 26 of the web guide support 14 is also shown.

The web guide support 14 may be mounted so that it rotates around axis 26, or it may be fixed. A rotating web guide support is preferred because damage to the web 12 is minimized in cases where the system fails to operate and the web 12 is no longer maintained away from the web guide support. On the other hand if the web guide support is stationary, damage to the web may be expected to be greater due to the resulting frictional engagement of the moving web and the stationary web guide support following failure of the system to maintain separation between the web 12 and web guide support 14.

In the apparatus described in the aforementioned U.S. Pat. No. 4,760,946, the web is kept in position as it enters and exits the reduced pressure housing by sealing rollers. The sealing rollers contact the web providing a stable surface against which rests the web back side. Air at atmospheric pressure flows from between the web inner side and the surface of the support into the housing keeping the web away from the support, and the web back pinned against the sealing rollers. Such arrangement secures the web in position and is not prone to web instabilities due to turbulence in the air stream.

The apparatus according to this invention does not have backing rollers and the web is supported off the reduced pressure housing walls by an air stream, shown as arrows A, flowing from outside the housing into the housing interior 23. This air stream develops a turbulent flow most pronounced near the point where the incoming air path opens into the housing interior 23. This occurs both near the web entry into the housing and the exit therefrom. Typically the point of maximum turbulence is also in the vicinity of the closest point between the web outer surface and the baffle 20 and 22 top surface.

The air turbulence causes web instabilities in the form of flutter which brings the web surface close to and in possible contact with either the web guide support 14, the baffles 20 and 22, or the housing side walls 27 and 29.

This contact could be prevented by increasing the distance between the baffle top surface and the web guide support in the web entry and exit area and by keeping the web further away from the web guide support. However, as this distance increases, the size of the opening into the reduced pressure box also increases. As a result, the air flow into the reduced pressure box increases to the point where it becomes unmanageable. Furthermore, because the distance separating the web inner surface 11 from the web guide support 14 is not only a function of the pressure difference between the two web sides, but also a function of the tension applied to the two ends of the web by the web driving system, the tension would also have to change to keep the web further away from the web guide support. Because the tension is controlled by the web driving system, changing the tension may possibly cause web drive problems.

The present invention obviates the above problems through the use of the two baffles 20 and 22, which, together with the web, define a specially designed wedge shaped entry and exit zone 28 and 30 respectively. The critical elements in this design are the location and size of the closest point of approach between the top surface of the baffle and the web guide support, and the angle between the baffle top surface and the web.

In the apparatus of the present invention, the airflow A is strongly affected by the form of the baffle surface which defines together with the outer web surface the shape of the wedge shaped channel, where this flow takes place. Reference will be frequently made to this surface in the remainder of this text as the baffle top surface.

Similarly, air flows from between the web inner surface 11 and web guide support 14 to the interior of the reduced pressure housing 16. This air flow is represented in FIG. 2 by arrows B and C. The airflows B and C are strongly affected by the shape of the web guide support which together with the web inner surface define the form of the back channel. In the embodiment illustrated in FIGS. 1 and 2, where the support is a smooth cylindrical surface, the back channel has a smooth profile and substantially the same width, since the web guide support is a cylinder which does not change its radius in the transversal direction. Such back channel profile and width is not essential however.

Different forms and radii of the web guide support can be applied at different transversal positions for the purposes of controlling the air flow in the back channel, as discussed later in this description.

In designing apparatus according to this invention the relative location and angle of the baffles and web guide support are significant and the following design elements and specifications are essential and are present in all structures.

As shown in FIG. 2, a first reference point E is identified on the web guide support in the area where the web enters the reduced pressure housing and first begins altering its direction, as the point where the web would first contact the web guide support 14 in the absence of reduced pressure in the reduced pressure housing 16. A second reference point E is similarly identified in the area where the web exits the reduced pressure housing and stops changing direction, as the point where the web would last contact the web guide support 14 in the absence of reduced pressure in the reduced pressure housing 16.

In addition to reference points E and E' there are also identified a first entry closest point M and a second exit closest point M' on the web guide support representing the points on the web guide support where the distances between M and entry baffle top surface and between M' and exit baffle top surface are at a minimum. These distances are designated as entry minimum distance $d_{min}$ and exit minimum distance $d'_{min}$, respectively. Once these points are identified, tangents to the surface at those points are drawn at the points E and M and E' and M' forming included angles $\delta$ and $\delta'$ respectively.

Points M and M' are selected so that angles $\delta$ and $\delta'$ are between 0° and 25° measured clockwise for the web entry location and counterclockwise for the web exit location. Preferably angles $\delta$ and $\delta'$ are between 5° and 15°.

The point on the baffle of the closest approach (at $d_{min}$) of the baffle top surface to the web guide support is designated as K (at $d'_{min}$) for the entry baffle and K' for the exit baffle, respectively. While E, E', M, M', K and K' are referred to (and shown in the figures depicting elevation views of the apparatus) as points on the web guide support or the baffles, it is understood that each represents an end view of a line extending parallel with the web guide support through that point. In cases where the web guide support includes raised portions such as flanges having a larger diameter than the middle portion of the web guide support, the minimum distances $d_{min}$ and $d'_{min}$ are measured from the highest points on the respective web guide support flanges.

In the embodiment shown in FIG. 2, K and K' are at the junction between the baffles top surface and the entry and exit side walls 27 and 29 of the reduced pressure housing 16. However this is not always the case, and, as shown in FIG. 2A point K may be the end point of the baffle 20' and may be inside the reduced pressure housing 16. In another embodiment shown in FIG. 2B, the point K may not be where the baffle 20" terminates, but may be an intermediate point on the baffle top surface. However the distance $d_{min}$ between point K and the web guide support, and the distance $d'_{min}$ between point K' and the web guide support, are always the shortest distances between the web guide support and the respective baffle surfaces.

$d_{min}$ is a function of the radius of curvature R of the web guide support at point M, and is between 2% and 15% of R. Thus in cases where the guide surface is a cylinder having a circular cross section, $d_{min}$ is between 2% and 15% of the radius of the cylindrical surface. Typically, $d_{min}$ is preferably at least 8 mm and may vary from about 8 mm to about 30 mm for most installations and web drives. The above relationships for $d_{min}$ and M are equally applicable to the relationships for $d'_{min}$ and M'. In a preferred embodiment, $d_{min}$ is equal to $d'_{min}$ and $\delta$ is equal to $\delta'$.

When reduced pressure is applied to the housing through the reduced pressure source 24 and connector 18, air is removed from the interior of the housing. Since the housing communicates with the atmosphere through the entry and exit zones, air flows from the outside through the entry and exit zones along arrows A into the housing.

As seen in FIG. 2, the entry zone 28 and exit zone 30 between web 12 and entry and exit baffles 20 and 22, respectively, are wedged shaped forming angles $\omega$ and $\omega'$ measured between the tangent to the web guide support at E and E' respectively, and a tangent to the baffle top surface at K and K' respectively. As a result, air flowing therethrough into the housing accelerates as the cross-section of the entry and exit zones is reduced.

Air also flows into the housing from behind the web along arrows B and C. By appropriate selection of the angle $\omega$ between the web outer surface and the baffle, the airflow in the entry zone is made faster than the airflow in the zone between the web guide support and the web inner surface. This higher speed results in a pressure differential between the inner surface 11 of the web which is substantially at ambient atmospheric pressure, and the outer surface 13 of the web, which pulls the web away from the web guide support.

In a balanced system, the force pulling the web away from the web guide support resulting from the pressure differential exactly balances the force resulting from the tension applied to the web by the web drive which tends to pull the web against the web guide support.

For the simple case of an apparatus with planar baffles which also terminate at points K and K' respectively, the angles $\omega$ and $\omega'$ are determined as follows.

With the baffle point K established and held fixed and the web running under tension though the reduced pressure housing, the baffle is pivoted around point K until the web is maintained about equidistant from the web guide support and the baffle at point K. In cases where the top baffle surface is a planar surface, the angle between the baffle and a tangent to the guide surface at E or E' is selected such that $\omega > \delta$ and $\omega - \delta$ is between 0 and 15 degrees.

If the baffles are not planar and/or do not extend beyond the points K and K' into the interior of the housing 16, any rotation of the baffles results inevitably in a shifting of the M, M', K and K' positions and also a corresponding change of the angle $\delta$ results from this. In such a situation the determination of the optimum $\omega$ value has to occur simultaneously with the setting of the optimum value of $\delta$.

Once the angle of the baffles has been determined and set, the web position in the vicinity of the point K (or K') does not change significantly even when the pumping rate is changed in wide ranges because, due to the pinning effect achieved by the high energy air flow in the vicinity of the point K, the web position here is defined predominantly by the position of the baffle top surface and the web always remains in close proximity to the baffle surface wherever the baffle is moved to.

For small changes in the applied web tension, the system is self stabilizing in the sense that it adapts itself automatically to any changes in the web tension if this change remains small. This is so because an increase of the web tension causes the web to be pulled closer to the web guide support thus reducing the clearance there between. This causes a corresponding decrease of the airflow C and helps therefore to establish a higher reduced pressure in the box even when the pumping rate remains unchanged.

Furthermore, because the clearance between the web and the web guide support at locations further away from point K (and K') is strongly affected by the pumping rate and web tension settings, for a given web tension, the pumping rate can be used for adjusting a desired clearance at locations further away from the point K (or K') whereas the situation in the vicinity of the point K (or K') can only be affected significantly by changing the angle ω (or ω') as described above. The practical consequence of this is that once the angle ω is set, it usually needs no readjustment and the pumping rate can be changed to accommodate strongly different web tension settings of the web drive system.

The baffle structure is preferably planar. This is not essential however and, as discussed in more detail in the aforementioned parent application U.S. Ser. No. 08/553,976, baffles with other than a planar top surface configuration may be used.

One such embodiment is illustrated in FIG. 2B which shows a baffle 20" having a convex surface. When a non planar top surface baffle is used, angle ω is defined as the angle between the tangent to the support at E and a tangent to the baffle surface at K, as shown in FIG. 2B.

Figure 3:
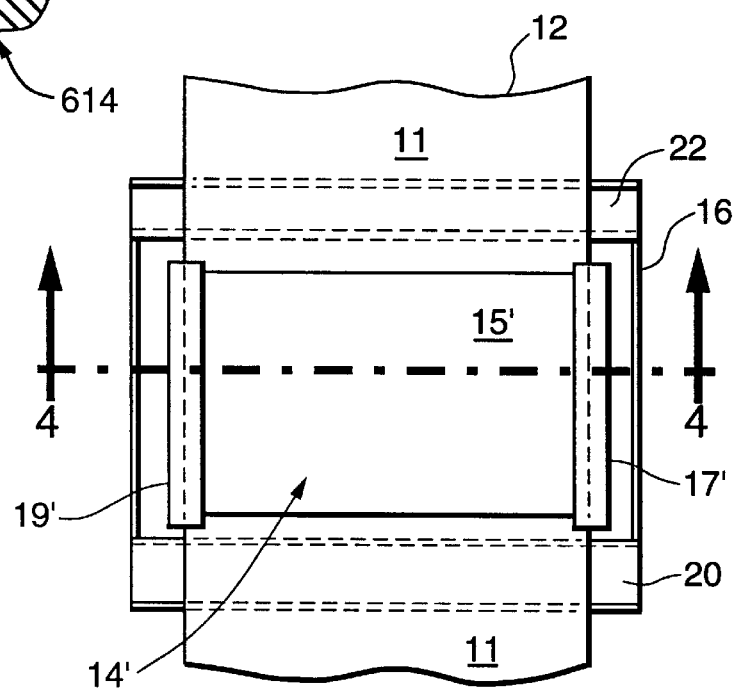
FIG. 3 is a schematic representation of a top view of an apparatus having a web support having raised flanges.
Figure 4:
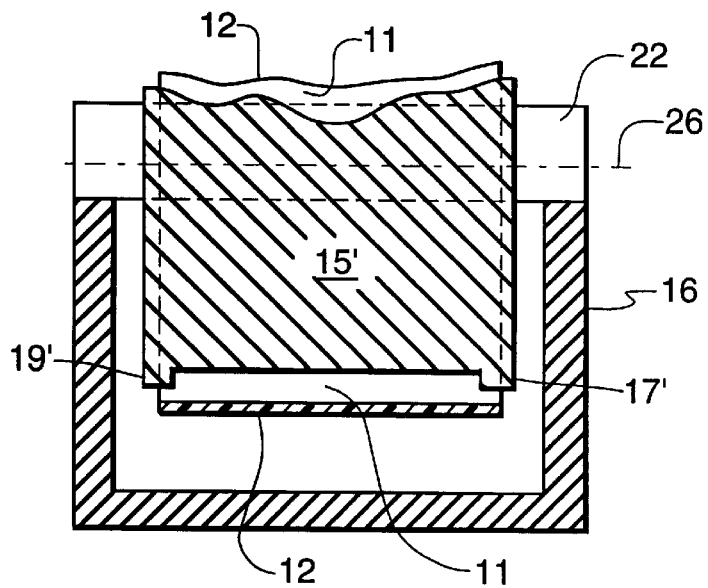
FIG. 4 is a schematic representation of a cross-section taken along arrows 4—4 in the embodiment of FIG. 3.

FIG. 3 shows a top view of an apparatus similar to that shown in FIG. 1, wherein the web guide support 14' comprises a raised left flange 19', a central portion 15' and a raised right flange 17'. As better shown in FIG. 4, the web 12 normally extends over at least a portion of the raised flanges 17' and 19'. In such case point M and M' are on the highest point of the raised flanges and $d_{min}$ is measured from this highest point.

Because the flanges are raised compared to the center portion of the web guide support, should the system malfunction, the web will contact the flanges first. In applications where the web is sufficiently stiff, such as polyethylene terephthalate base used in the photographic film manufacturing industries, such contact will be limited along the web edges, resulting in minimum damage. This is particularly true when the web guide support also rotates at a circumferential speed matching the web speed.

Figure 5:
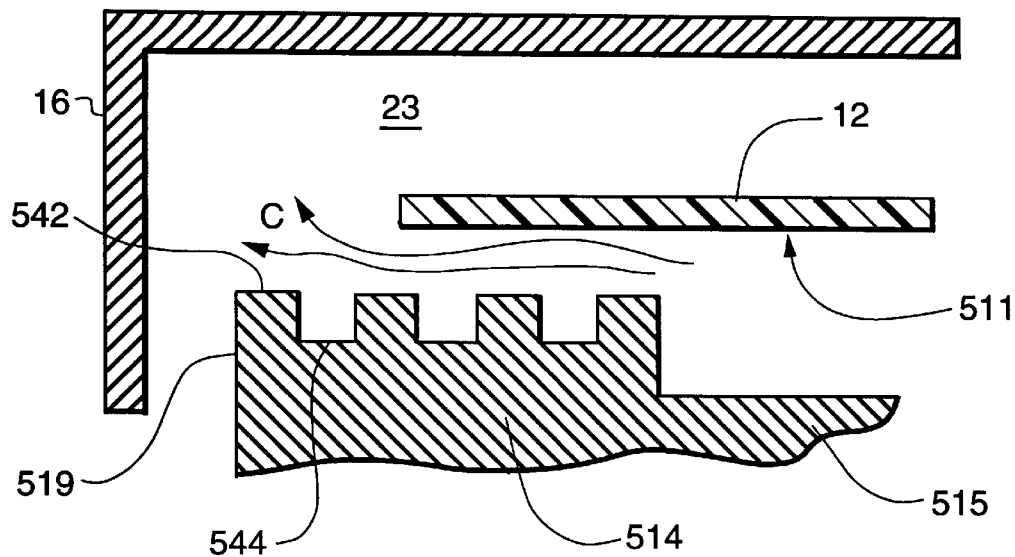
FIG. 5 shows the air flow over an edge portion of yet another web guide support which includes raised flanges having a labyrinth profile.

FIG. 5 shows an alternate design for the flange portion of the web guide surface. In this design the web guide support 514 again includes two flanges, (only one, 519, of which is shown) in the figure. The flanges terminate in a labyrinth profile having a plurality of peaks 542 and valleys 544. The web 12 floats above the flange supported on an air layer flowing from the space between the web guide support central portion 515 and the inner web surface 511 to the housing 16 interior space 23. The air flow is schematically shown as arrows C.

Figure 6:
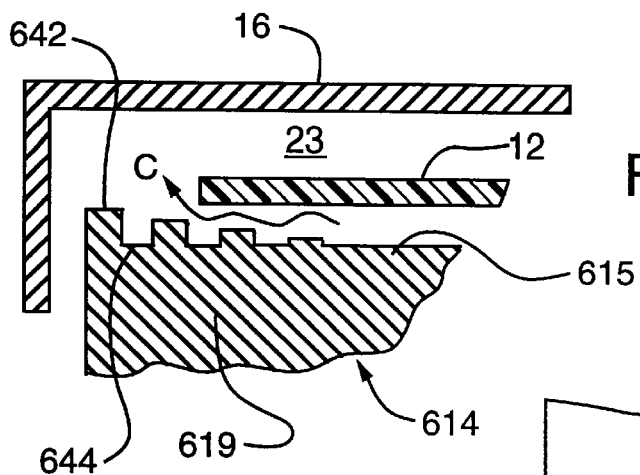
FIG. 6 shows the air flow over an edge portion of a yet another web guide support which includes a labyrinth having continuously increasing height peaks at the support ends.

FIG. 6 shows yet another variation of a web guide support 614 used in an apparatus of the type shown in FIG. 1 wherein there are again two raised flanges (only one, 619, of which is shown). The flange profile contains peaks 642 and valleys 644 which are progressively higher than the web guide support central portion 615. Such design tends to keep the web centered by forcing a continuously stronger stream of air flow C at a sharper angle against the web edge as the web tends to drift toward the higher peak area of the flange.

Figure 7:
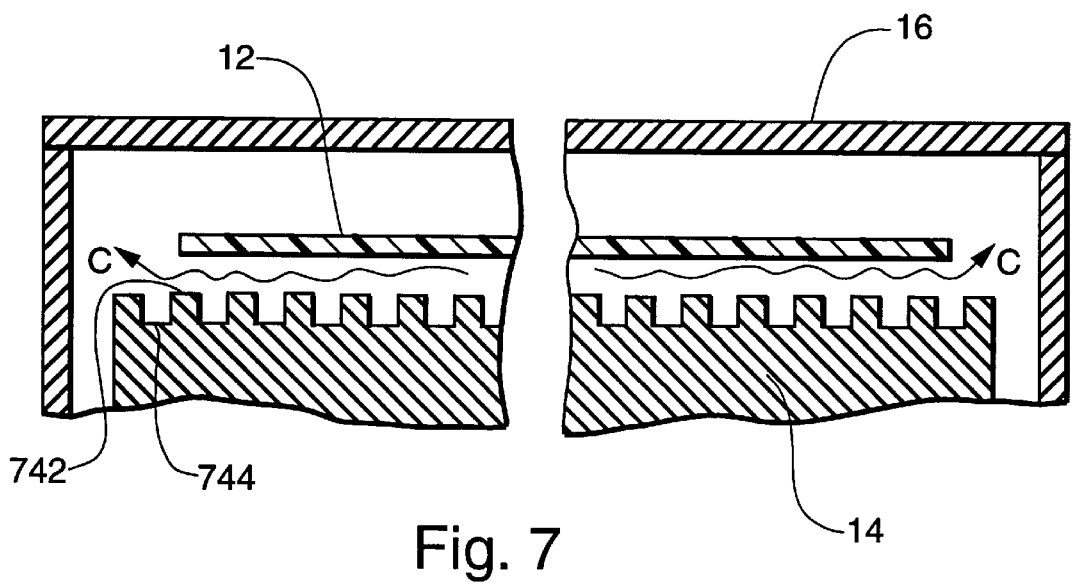
FIG. 7 shows the air flow over yet another web guide support having a labyrinth profile extending over the full width of the support.

In yet another embodiment of the web guide support, the surface of the web guide support contains grooves forming a labyrinth which extends the full width of the support, as illustrated in lo FIG. 7. While flowing over the peaks 742 and valleys 744, the air flow C constantly changes its speed and direction. This results in significantly restricting the rate of air flow C in effect creating a seal for the space at the central web section. This phenomenon is commonly referred to as labyrinth sealing and the highly efficient sealing effect associated with it can be used for increasing the clearance between the web and the web guide support significantly without increasing the air flow C considerably. This in turn helps to avoid any accidental contact with the web in case of web tension fluctuations while still keeping the energy needs of the reduced pressure source within tolerable limits.

Figure 8:
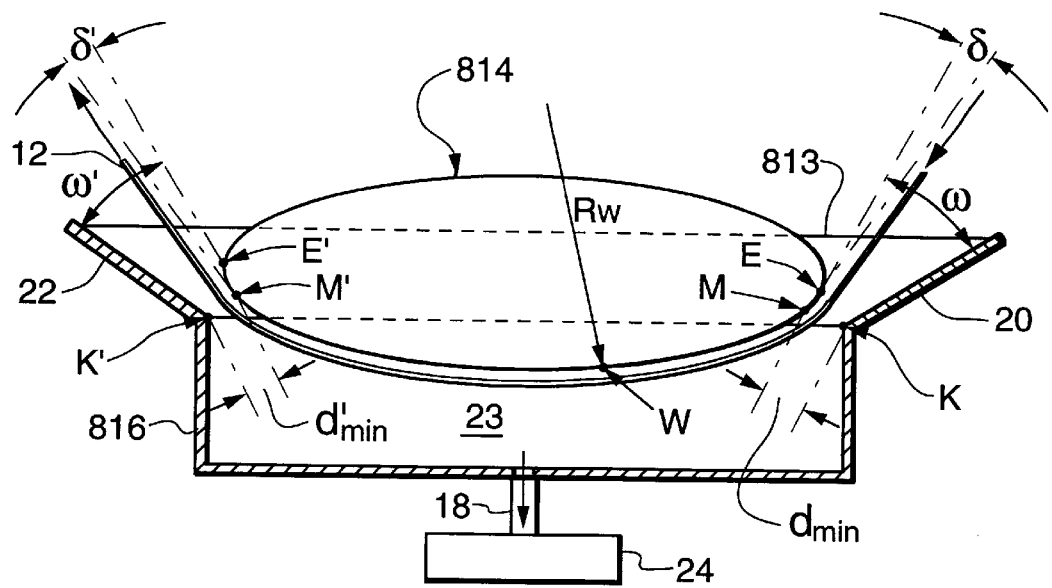
FIG. 8 is a schematic elevation representation of another alternate apparatus constructed in accordance with the present invention wherein the web guide support is elliptical.

FIG. 8 shows yet another embodiment of the present invention. The apparatus again includes a reduced pressure housing 816, a source of reduced pressure 24 connected to the housing through connector 18. The housing again forms an interior space 23 in which is partially inserted a web guide support 814. Baffles 20 and 22 are again located at the entry and exit of the web into the housing, using the same design methods discussed earlier in conjunction with FIG. 2. The only difference in this embodiment is the support 814 which has an elliptical cross-section. In this embodiment, housing 816 sides 813 are shown to extend to encompass the baffles 20 and 22.

In configurations other than a circular cross section for the guide support, any point W on the surface has a corresponding circular curvature with a radius Rw referred to as a local radius of curvature. It is this value of Rw which is used in determining $d'_{min}$ as being 2% to 15% of the local radius of curvature at point M. The local radius of curvature is the same for every point on a web guide support with a circular cross section, thus the local radius of curvature equals the radius of curvature for a web guide support with a circular cross section. Returning to the web guide support with an elliptical cross section, reference points E, E', M, M' and corresponding points K and K' are again selected as before. The same limitations to angle δ and δ' remain effective and the baffle angles ω and ω' are experimentally determined as for the case of the structure shown in FIG. 2 discussed earlier.

Figure 9:
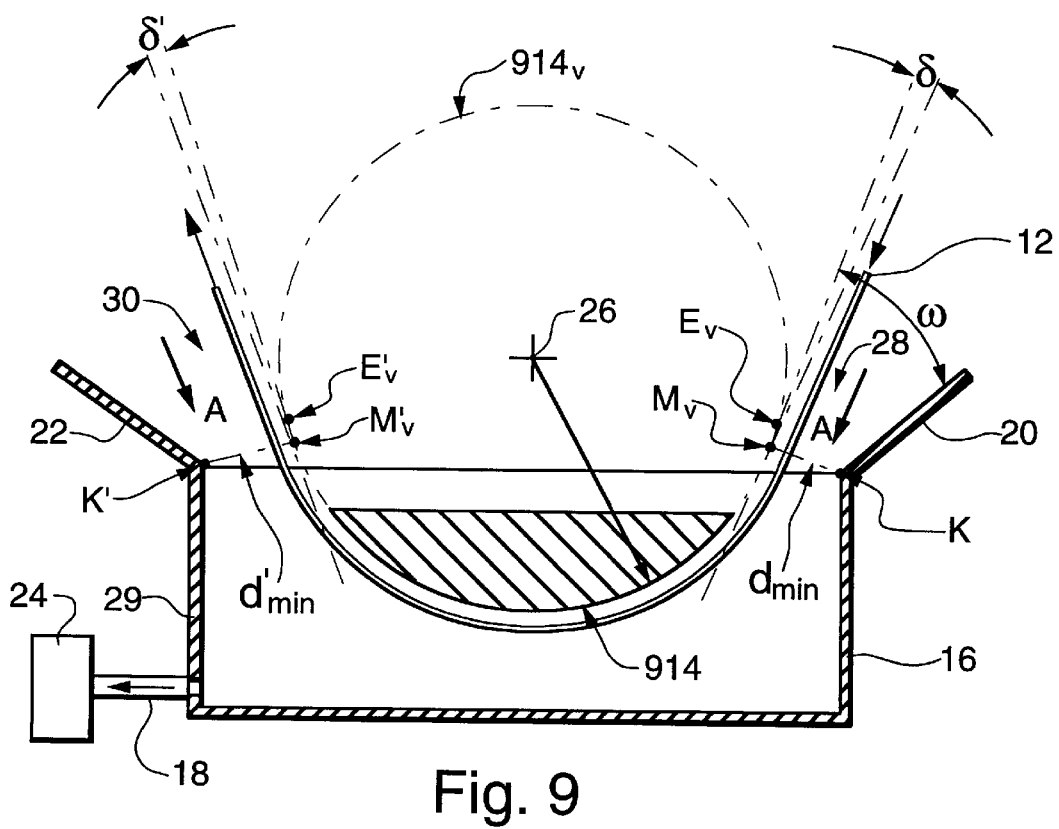
FIG. 9 is a schematic elevation representation of yet another apparatus constructed in accordance with the present invention wherein the web guide support is only a segment of a cylinder.

FIG. 9 shows another embodiment which represents a variation of the embodiment shown in FIG. 2. All elements are the same, except that the web guide support 914 is not a complete cylinder but only a segment of a cylindrical surface. The full cylindrical surface 914$_v$ is shown in dotted lines. The relative positioning of the baffle edge K and the reference points E and M is done in the same manner as previously as if the support was a complete cylinder rather than a segment of one.

In this instance, however, the points E, E', M, and M' are virtual reference points $E_v$, $E_v'$, $M_v$, and $M_v'$ located on a virtual web guide surface 914$_v$. This virtual web guide surface is used for calculation purposes in order to place the baffles at the right point, even though the support may not physically extend to include points E and M.

In the simplest case where the baffles are planar and where the closest point K is also the end point of the baffle, the location and orientation of the baffles is obtained as follows:

First, points E and E' are identified. These points are typically fixed by the geometry of the web drive system. Once points E and E' are determined, angles δ and δ' are selected within the limits discussed earlier, and points M and M' established. With M and M' established, $d_{min}$ is selected within the permissible range of $d_{min}$ values. The system is now operated and the baffle angles ω and ω' set for optimum performance as described earlier. If no value of ω and ω' give satisfactory results, δ, and δ', and $d_{min}$ are reset and new values for ω and ω' determined.

When the point K is not the end of the baffle, or when the baffles are not planar, rotation of the baffle around point K may result in such point shifting and causing both angle δ and $d_{min}$ to fall outside the permissible limits. In such cases any changes in the angle ω will typically require a check of the new δ and $d_{min}$ and possible an adjustment to assure that both $d_{min}$ and δ remain within acceptable limits.

Those skilled in the art having the benefit of the teachings of the present invention as hereinabove set forth, can effect numerous modifications thereto. These modifications are to be construed as being encompassed within the scope of the present invention as set forth in the appended claims.

The invention claimed is:

1. An apparatus for guiding and changing a direction of a moving web without contacting an inner surface and an outer surface of said web, said apparatus comprising:

a reduced pressure box having an interior, a source of reduced pressure connected to said reduced pressure box and providing reduced pressure in said reduced pressure box;

a convex web guide support partially contained within said reduced pressure box interior and having a first reference entry point (E) where the web would first contact the web guide support in an absence of said reduced pressure in said reduced pressure box;

an entry baffle having a top surface;

a second reference point (M) on the web guide support closest to said entry baffle top surface;

a third reference point (K) on the top surface of the entry baffle closest to said second reference point (M);

an entry minimum distance ($d_{min}$) between said second reference point (M) and said third reference point (K); and a first angle (δ) defined between a first tangent to the web guide support at the first reference entry point (E) and a second tangent to the web guide support at the second reference entry point (M) said first angle (δ) having a value of between 0 and 25 degrees.

2. The apparatus according to claim 1 wherein each said point on the convex web guide support has a corresponding local radius of curvature and the entry minimum distance ($d_{min}$) is between 2% and 15% of the local radius of curvature at said second reference point (M).

3. The apparatus according to claim 1 wherein the convex web guide support is a cylinder having a radius and the entry minimum distance ($d_{min}$) is between 2% and 15% of the cylinder radius.

4. The apparatus according to claim 1 wherein the entry minimum distance ($d_{min}$) is at least 8 mm.

5. The apparatus according to claim 1 wherein the entry minimum distance ($d_{min}$) is between about 8 mm and about 30 mm.

6. The apparatus according to claim 1 wherein the first angle (δ) is between 5 and 15 degrees.

7. The apparatus according to claim 1 further comprising:

an exit baffle having a top surface;

a fourth reference exit point (E') on the web guide support corresponding to a point where the web would last contact the web guide support in the absence of the reduced pressure in the reduced pressure box;

a fifth reference point (M') on the web guide support corresponding to a point on said web guide support closest to said exit baffle top surface;

a sixth reference point (K') on the top surface of the exit baffle corresponding to a point on said exit baffle top surface closest to said web guide support;

wherein a distance measured between the fifth reference point (M') and the sixth reference point (K') is an exit minimum distance ($d_{min}$), and a third tangent to the web guide support at the fourth reference exit point (E') and a fourth tangent to the fifth reference point (M') form a second angle (δ') between 0 and 25 degrees.

8. The apparatus according to claim 7 wherein the entry minimum distance ($d_{min}$) is equal to the exit minimum distance ($d_{min}$) and the first angle (δ) is equal to the second angle (δ).

9. The apparatus according to claim 7 wherein the entry minimum distance ($d_{min}$) and the exit minimum distance ($d_{min}$) are each at least 8 mm.

10. The apparatus according to claim 7 wherein the entry minimum distance ($d_{min}$) and the exit minimum distance ($d_{min}$) are each between about 8 mm and about 30 mm.

11. The apparatus according to claim 7 wherein the reduced pressure box is connected to the exit baffle at the sixth reference point (K').

12. The apparatus according to claim 1 wherein the reduced pressure box is connected to the entry baffle at the third reference point (K).

13. The apparatus according to claim 1 wherein a tangent to the entry baffle top surface at the third reference point (K) and forms an acute angle (ω) measured between the tangent to the entry baffle top surface and the first tangent to the web guide support.

14. The apparatus according to claim 13 wherein the acute angle (ω) is greater than the first angle (δ) by no more than 15 degrees.

15. The apparatus according to claim 13 wherein the acute angle (ω) is adjusted to maintain the web between the second reference point M and the third reference point (K) for an applied said reduced pressure in the reduced pressure box and a longitudinal tension applied to the web.

16. The apparatus according to claim 1 wherein the entry baffle is curved and a tangent to the entry baffle top surface at the third reference point (K) forms an acute angle (ω) with the first tangent to the web guide support.

* * * * *

UNITED STATES PATENT AND TRADEMARK OFFICE
CERTIFICATE OF CORRECTION

PATENT NO. : 5,950,899
DATED : September 14, 1999
INVENTOR(S) : Altan Bassa

It is certified that error appears in the above-identified patent and that said Letters Patent is hereby corrected as shown below:

In col. 10, lines 18-19, "exit minimum distance (dmin)" should read --exit minimum distance (d'min)--.

In col. 10, lines 24-25, "exit minimum distance (dmin)" should read --exit minimum distance (d'min)--.

In col. 10, line 25-26, "second angle ($\delta$)" should read --second angle ($\delta$')--.

In col. 10, line 28-29, "exit minimum distance (dmin)" should read --exit minimum distance (d'min)--.

In col. 10, line 32-33, "exit minimum distance (dmin)" should read --exit minimum distance (d'min)--.

Signed and Sealed this

Eleventh Day of April, 2000

Attest:

Q. TODD DICKINSON

*Attesting Officer*

*Director of Patents and Trademarks*